US011132478B2

(12) United States Patent
Nomura et al.

(10) Patent No.: US 11,132,478 B2
(45) Date of Patent: Sep. 28, 2021

(54) METHODS FOR COMBINATORIAL CONSTRAINT IN TOPOLOGY OPTIMIZATION USING SHAPE TRANSFORMATION

(71) Applicants: Toyota Motor Engineering & Manufacturing North America, Inc., Plano, TX (US); The Regents of the University of Michigan, Ann Arbor, MI (US)

(72) Inventors: Tsuyoshi Nomura, Novi, MI (US); Kazuhiro Saitou, Ann Arbor, MI (US); Yuqing Zhou, Ann Arbor, MI (US)

(73) Assignees: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 344 days.

(21) Appl. No.: 16/164,021

(22) Filed: Oct. 18, 2018

(65) Prior Publication Data
US 2019/0236221 A1    Aug. 1, 2019

Related U.S. Application Data

(60) Provisional application No. 62/625,032, filed on Feb. 1, 2018.

(51) Int. Cl.
*G06F 30/20* (2020.01)
*G06F 111/04* (2020.01)

(52) U.S. Cl.
CPC .......... *G06F 30/20* (2020.01); *G06F 2111/04* (2020.01)

(58) Field of Classification Search
CPC ....... G06F 30/20; G06F 2111/04; G06K 9/34; G06K 9/4638

(Continued)

(56) References Cited

U.S. PATENT DOCUMENTS 7,573,866 B2    8/2009 Nikolova et al.
8,571,278 B2 *  10/2013 Sonka .................. G06T 7/11
                                        382/128

(Continued)

FOREIGN PATENT DOCUMENTS

WO    2017044499    3/2017

OTHER PUBLICATIONS

Volume of Hypercubes Clipped by Hyperplanes and Combinatorial Identities, https://anxiv.org/pdf/1512.07768.pdf, Feb. 11, 2017.

(Continued)

*Primary Examiner* — Thai Q Phan
(74) *Attorney, Agent, or Firm* — Dinsmore & Shohl LLP

(57) ABSTRACT

Methods for combinatorial choice in topology optimization are disclosed. In one embodiment, a method of performing combinatorial choice in a non-linear programming problem for designing a structure includes establishing, by one or more processors, a set of K variables, wherein the set of K variables defines an K-dimensional unit cube in a normal coordinate system. The K-dimensional unit cube includes a plurality of desired vertices representing a plurality of desired combinations that satisfy a constraint and a plurality of undesired vertices representing a plurality of undesired combinations that do not satisfy the constraint. The method further includes transforming the K-dimensional unit cube into a transformed shape in a transformed coordinate system using a shape function. Values of the set of K variables cannot have a combination represented by the plurality of undesired combinations.

20 Claims, 7 Drawing Sheets

(58) Field of Classification Search
USPC .............................................. 703/2; 382/128
See application file for complete search history.

(56) References Cited

U.S. PATENT DOCUMENTS

| | | | |
|---|---|---|---|
| 9,576,088 B2 | 2/2017 | Nomura et al. | |
| 10,796,480 B2* | 10/2020 | Chen | G06T 7/50 |
| 2008/0228764 A1 | 9/2008 | Soogoor | |
| 2009/0136103 A1* | 5/2009 | Sonka | G06K 9/6224 |
| | | | 382/128 |
| 2013/0163808 A1 | 6/2013 | Clements et al. | |
| 2015/0178988 A1* | 6/2015 | Montserrat Mora | G06T 13/40 |
| | | | 345/420 |
| 2017/0017476 A1 | 1/2017 | Ebcioglu et al. | |
| 2017/0124233 A1* | 5/2017 | Nomura | G06F 17/16 |
| 2019/0035149 A1* | 1/2019 | Chen | G06T 7/50 |
| 2019/0236220 A1* | 8/2019 | Nomura | G06F 30/20 |
| 2020/0086624 A1* | 3/2020 | Daynes | B33Y 50/02 |

OTHER PUBLICATIONS

Yuqing Zhou et al., "Multi-component topology and material orientation design of composite structures (MTO-C)", Computer Methods in Applied Mechanics and Engineering, vol. 342, Dec. 1, 2018, pp. 438-457.

Sohouli A. et al., "Design optimiation of thin-walled composite structures based on material and fiber orientation," Composite Structures, Elsevier Science Ltd, GB, vol. 176, Jun. 15, 2017, pp. 1081-1095.

Christian Frier Hvejsel et al., "Material interpolation schemes for unified topology and multi-material optimization," Structural and Multidisciplinary Optimization, Springer, Berlin, De, vol. 43, No. 6, Jan. 27, 2011, pp. 811-825.

Tsuyoshi Nomura et al., "General topology optimization method with continuous and discrete orientation design using isoparametric projection: Topology and Orientation Design Using Isoparametric Projection," International Journal of Numerical Methods in Engineering, vol. 101, No. 8, Dec. 12, 2014, pp. 571-605.

PCT Application No. PCT/US2019/015969, Notification of Transmittal of the International Search Report and the Written Opinion of the International Search Authority; Written Opinion of the International Searching Authority, dated Apr. 5, 2019.

* cited by examiner

METHODS FOR COMBINATORIAL CONSTRAINT IN TOPOLOGY OPTIMIZATION USING SHAPE TRANSFORMATION

CROSS-REFERENCE TO RELATED APPLICATIONS

This application claims priority to U.S. Provisional Patent Application No. 62/625,032 entitled "COMBINATORIAL CONSTRAINT USING HYPERCUBE" and filed on Feb. 1, 2018, which is hereby incorporated by reference in its entirety.

TECHNICAL FIELD

The present specification generally relates to methods for topology optimization and, more particularly, methods for combinatorial constraint in topology optimization using shape transformation.

BACKGROUND

Computer aided engineering analysis, for example, topology optimization techniques such as finite element models (FEM), incorporate computational techniques that are used to find approximate solutions to engineering problems.

The combinatorial choice problem in non-linear programming is made under a constrain to keep the sum of a binary variable set to a given value. In a single choice problem $m_i=[0,1]$, $\Sigma_{i=0}^{n} m_i=1$, where [0,1] means either 0 or 1. A common problem setup is a single choice constraint where the sum of the binary variable set is 0 or 1. As an example, in a multiple component design, a single design point in the structure may only be one type of material among a set of materials.

Because it is difficult to handle binary variable and equality constraints with gradient-based linear problem solvers, it is converted into real value variables with inequality constraints, i.e., $m_i=[0,1]$, $\Sigma_{i=0}^{n} m_i<1$. One example implementation of constraint is $w_i=x_i^p \pi_{k=1}^{n}(1-x_{k \neq 1})^p$. This example may be expanded with n=3 and i=1 as $w_i=x_i^p(1-x_2)^p(1-x_3)^p$, where p is a penalization parameter to underestimate the value of w when x is an intermediate value between 0 and 1. Therefore, w1 survives when (x1, x2, x3)=(1,0,0). However, such methods are inflexible and complicated to implement.

SUMMARY

In one embodiment, a method of performing combinatorial choice in a non-linear programming problem for designing a structure includes establishing, by one or more processors, a set of K binary variables, wherein the set of K binary variables defines an original design search space including a K-dimensional unit cube in a normal coordinate system, and the K-dimensional unit cube includes a plurality of desired vertices representing a plurality of desired combinations that satisfy a constraint and a plurality of undesired vertices representing a plurality of undesired combinations that do not satisfy the constraint. The method further includes transforming the K-dimensional unit cube from the normal coordinate system into a transformed shape in a transformed coordinate system using a shape function. The shape function shifts the plurality of undesired vertices such that a design search space of transformed shape is smaller than a design search space of the K-dimensional unit cube. Values of the set of K binary variables cannot have a combination represented by the plurality of undesired combinations.

In another embodiment, a method of designing a structure by computer-implemented topology optimization includes establishing, by one or more processors, a plurality of design points within a design domain, and establishing a set of K variables for at least one design point of the plurality of design points, wherein the set of K variables defines a K-dimensional unit cube in a normal coordinate system. The method further includes transforming the K-dimensional unit cube into a transformed shape in a transformed coordinate system using a shape function, and iteratively executing a topology optimization algorithm until an objective function is minimized using current values of the set of K variables in the normal coordinate system. Each execution of the topology optimization algorithm updates values of the set of K variables. After each iteration of the execution of the topology optimization algorithm, the method further includes projecting the current values of the set of K variables onto the transformed shape in the transformed coordinate system, thereby establishing projected current values of the set of K variables, executing the objective function using the projected current values of the set of K variables, and determining if the objective function is minimized. When the objective function is not minimized, the method includes updating the projected current values and projecting the updated projected current values into the K-dimensional unit cube in the normal coordinate system. When the objective function is minimized, the method includes projecting the projected current values into the K-dimensional unit cube and terminating the topology optimization algorithm. Termination of the topology optimization algorithm results in the set of K variables being defined by binary variables in a desired combination.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the appended figures, embodiments of the present disclosure are directed to computer-implemented combinatorial constraint in topology optimization using shape transformation. As a non-limiting example, embodiments may include topology optimization methods for designing structures made of multiple composite components (i.e., substructures). In the methods described herein combinatorial choice is handled by transformation of an original search space by using a shape function, $x'=N(x)_m$. A topology optimization algorithm is iteratively executed using current values of a set of variables until an objective function is minimized (e.g., minimized for compliance) After each iteration, values of the set of variables are provided from a unit cube in a normal coordinate system into a transformed shape in a transformed coordinate system by the shape function. As described in more detail, undesirable vertices of the unit cube are shifted to encourage convergence of the set of variables to a desirable outcome based on the constraint. The objective function is evaluated using the transformed values. If the objective function is not minimized, the transformed values are projected back into the unit cube of the normal coordinate system and the topology optimization algorithm is again executed using the modified values. The process is iteratively executed until the objective function is minimized.

Figure 1A:
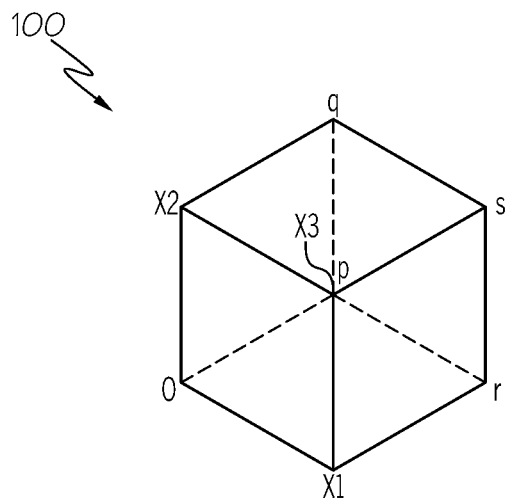
FIG. 1A schematically depicts a unit cube representing a design space in a normal coordinate system according to one or more embodiments described and illustrated herein.
Figure 1B:
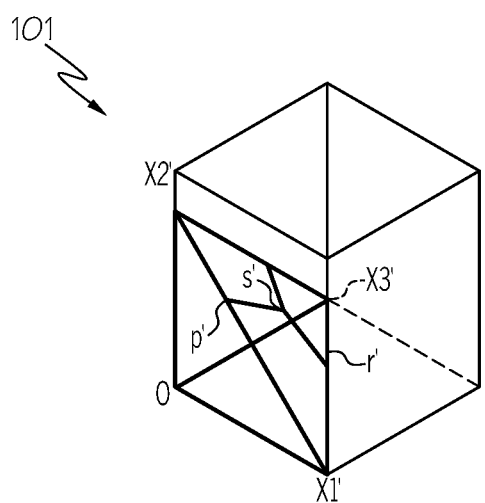
FIG. 1B schematically depicts a tetrahedron representing a transformed shape in a transformed coordinate system that is transformed from the normal coordinate system of FIG. 1A by a shape function according to one or more embodiments described and illustrated herein.

As an example, in a three variable case, i.e., $x_i=(0,1)$, for i=1, 2, 3, the variable space of this example variable set form a unit cube as shown in FIG. 1A. Applying the shape function $x'=N(x)_m$, the transformed shape is a tetrahedron as shown in FIG. 1B. It is impossible for the values of the variable set to reach (1,1,0), (1,0,1), (0,1,1) or (1,1,1) and $\Sigma_{i=0}^{n} x_i$ is always less than or equal to 1.

The embodiments of the present disclosure may be applied in any combinatorial choice problem. Although embodiments are described in the context of choice of material in a multi-component structure, embodiments are not limited thereto.

Embodiments described herein generalize choice problems and provide a large degree of flexibility of the problem setup. For simplicity, we start with a three variable case where $x_i=(0,1)$, for i=1, 2, 3. The problem to be solved is optimization problems with three design variables, x1, x2 and x3 under constraint that only a single variable can be equal to 1 and the rest of the variables should be equal to 0.

Figure 2:
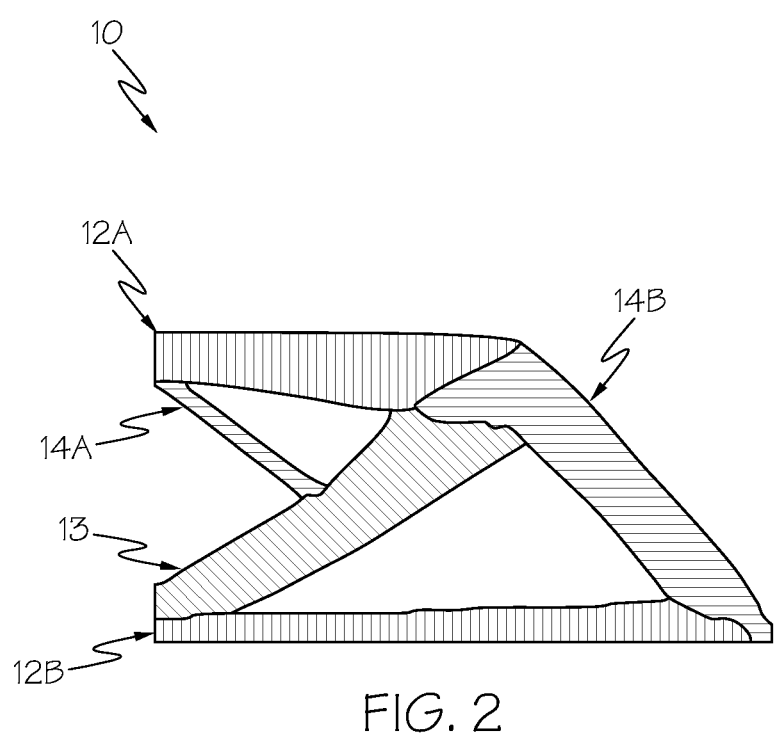
FIG. 2 schematically depicts a structure designed using the shape transformation and topology optimization according to one or more embodiments described and illustrated herein.

FIG. 2 provides a non-limiting example of a result of a three variable optimization problem. FIG. 2 schematically illustrates an example structure 10 resulting from a gradient-based topology optimization algorithm minimized for compliance. Each design point in the design space may be assigned no material, a first material, a second material, or a third material. In the illustrated embodiment, component 12A and component 12B comprise the first material, component 13 comprises the second material, and component 14A and component 14B comprise the third material. Design points outside of these components are assigned no material (i.e., void space). For example, the first material may be represented by x1, the second material represented by x2, and the third material represented by x1. Because each design point can have no material or one of the three material choices, the problem is a single choice constraint such that the sum of the variables for each design point must be 0 or 1.

The K variable set (K=3) of this example forms a unit cube 100 in a normal coordinate system as shown in FIG. 1A. It should be understood that embodiments are not limited to three variables. Each side of the unit cube 100 has a length of 1. The range 0<x1<1, 0<x2<1, and 0<x3<1 bound the cube. The unit cube 100 has desirable vertices of 0 (0,0,0), x1 (1,0,0), x2 (0,1,0), and x3 (0,0,1). The unit cube 100 also has undesirable vertices representing combinations that do not satisfy the constraint of the sum of the variables x1, x2, and x3 being 0 or 1: p (1,1,0), q (0,1,1), r (1,0,1), and s (1,1,1). The desirable vertices represent desirable combinations in accordance with the constraint (i.e., summation of the variables equal to 0 or 1). The undesirable vertices represent undesirable combinations that do not satisfy the constraint.

Figures 3A, 3B:
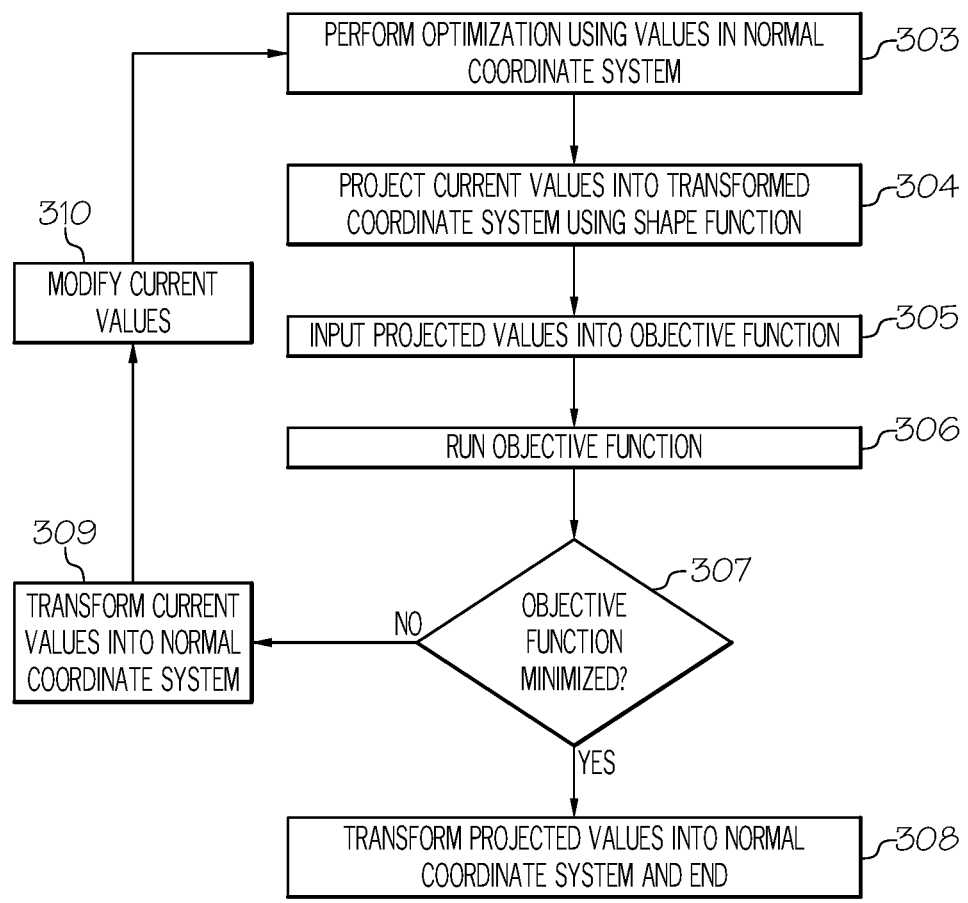
FIG. 3A depicts a flowchart of an example process for transforming a unit cube in a normal coordinate system into a transformed shape of a transformed coordinate system according to one or more embodiments described and illustrated herein.
FIG. 3B depicts a flowchart of an example process for using a shape function and topology optimization algorithm to design a structure according to one or more embodiments described and illustrated herein.

FIG. 3A illustrates an example process for transforming the unit cube into a transformed shape. At block 301, a set of K binary variables is established. The set of K binary variables defines an original design search space comprising a K-dimensional unit cube in a normal coordinate system. The K-dimensional unit cube has a plurality of desired vertices representing a plurality of desired combinations that satisfy a constraint, as well as a plurality of undesired vertices representing a plurality of undesired combinations that do not satisfy the constraint.

Next, in block 302, the K-dimensional unit cube is transformed from the normal coordinate system into a transformed shape in the transformed coordinate system using a shape function.

A geometric transformation of the unit cube 100 is performed by a shape function $x'=N(x)$, where x and x' are vector values before and after transformation, respectively. The shape function takes coordinates in a normal coordinate system, x (the original coordinate system shown in FIG. 1A) and calculates coordinates in a real coordinate system, x' (the transformed coordinate system shown in FIG. 1B).

To achieve the constraint wherein the sum of the variables must be 0 or 1, the unit cube 100 of FIG. 1A is transformed into a tetrahedron 101 as shown in FIG. 1B. In the tetrahedron 101, the undesirable vertices have been shifted inward as p', q', r', and s'. By moving vertices p, q, r and s to p', q', r', and s', respectively, the transformed shape is tetrahedral with vertices o, x1', x2', and x3'. Now, it is impossible to reach (1,1,0), (1,0,1), (0,1,1) or (1,1,1), and $\Sigma_{i=0}^{n} x_i$ is always less than or equal to 1. Thus, undesirable combinations are avoided. By pushing the absolute value of x' to 1, x' converges in to either (1,0,0), (0,1,0) or (0,1,1) for any kind of problem.

One advantage of using a shape function is that the transformed coordinates can be controlled by a given vertex set. Therefore, transformation from cube to tetrahedral is possible by a given vertex set as shown in FIGS. 1A and 1B.

The shape function may be utilized to solve any type of choice problem. For example, referring to FIG. 2, the choice problem may be selection of one material or no material for each design point within a design space to design a structure 10 having a minimum compliance.

As a non-limiting example, the shape function and transformation methods described herein may be used to select membership representing a material in a membership variable for each design point in a topology optimization problem to design a structure as described in U.S. Patent Publication Number 2019/0236220 A1, which is hereby incorporated by reference in its entirety. In this example, the structure being designed may take on a certain material (e.g., a fiber, such as variable access composite) having an orientation (e.g., fiber orientation) at a certain density.

The membership variable, which is projected onto a simulation module, describes which component a design point within the design domain belongs to. The membership variable enables optimization of decomposition of a structure without prescribed partitioning. Thus, the partitioning is performed by the optimization process itself.

As an example and not a limitation, the membership variable has three design fields. In this example, the design fields include a membership field, a density field, and an orientation field. If a structure is going to be a part having three components, such as the structure 10 illustrated by FIG. 1, the optimization method may have three membership fields, three density fields and three orientation fields.

Figures 4A, 4B:
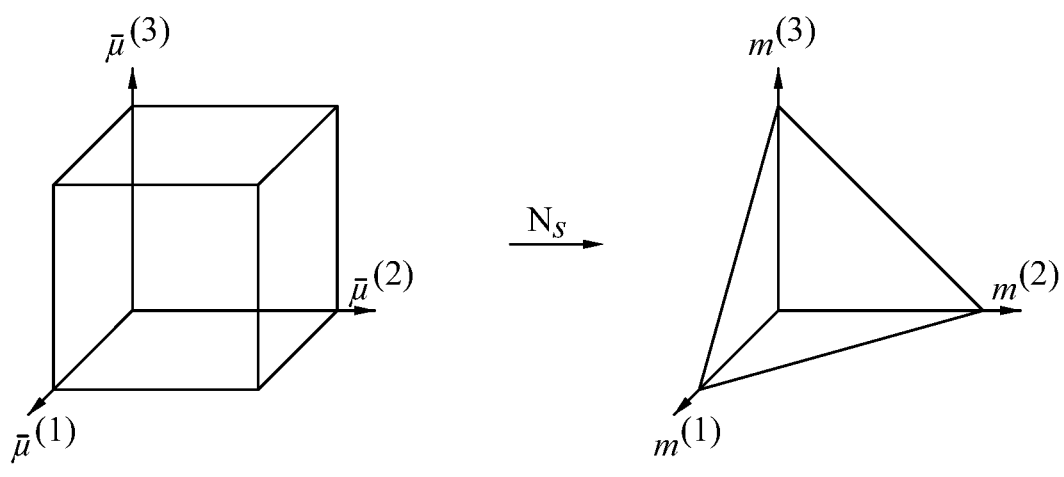
FIGS. 4A and 4B graphically illustrate an example coordinate transformation for a component membership design field through a K-dimensional cube projection for an example case of K=3 according to one or more embodiments described and illustrated herein.

A description of selection of the material density field and the material orientation field is provided in U.S. patent application Ser. No. 16/163,950. Following the similar regularization scheme as material density and orientation design fields, an original membership field $\mu^{(k)}$ is transformed to $\tilde{\mu}^{(k)}$ and then $\bar{\mu}^{(k)}$ through the Helmholtz PDE filter and regularized Heaviside projection. For each design point, the resulting $\bar{\mu}=(\bar{\mu}^{(1)}, \bar{\mu}^{(2)} \ldots \bar{\mu}^{(K)})$ is bounded by a K-dimensional unit cube $[0, 1]^K$. As illustrated by FIGS. 4A and 4B, the regularized component membership vector field $\bar{\mu}$ in a cube domain (FIG. 4A) is then projected to a standard simplex domain (FIG. 4B) through a projection $N_S$:

$$m = N_s(\bar{\mu}), \quad (1)$$

where $m=(m^{(1)}, m^{(2)}, \ldots, m^{(K)})$ is the projected component membership vector field. The transformation from a cube domain to a standard simplex domain eliminates the need of unity constraint $m^{(1)}+m^{(2)}+\ldots+m^{(K)}=1$ for each design point and ensures singularity-free numerical analyses.

The cube-to-simplex projection $N_S=(N_S^{(1)}, N_S^{(2)}, \ldots, N_S^{(K)})$ is defined as:

$$m^{(k)} = N_S^{(k)}(\bar{\mu}) = \Sigma_{i=1}^{M} S_i^{(k)} \{(-1)^{(K+\Sigma_{k=1}^{K} c_i^{(k)})} \Pi_{k=1}^{K} (\bar{\mu}^{(k)} + c_i^{(k)} - 1)\}, \quad (2)$$

where $M=2^k$ and $c_i^{(k)} \in \{0, 1\}$ are the number of vertices and the k-th element of the i-th vertex of a K-dimensional unit cube, respectively; and $s_i^{(k)}$ is vertex $c_i^{(k)}$ projected to a K-dimensional standard simplex domain given as:

$$S_i^{(k)} = \begin{cases} \dfrac{c_i^{(k)}}{\Sigma_{k=1}^{K} c_i^{(k)}} & \text{if } \Sigma_{k=1}^{K} C_i^{(k)} \geq 1. \\ 0 & \text{otherwise} \end{cases} \quad (3)$$

It should be understood that embodiments are not limited to the combinatorial choice and design problem as described by U.S. patent application Ser. No. 16/163,950.

Referring now to FIG. 3B, a flowchart showing an example process for utilizing shape transformation in a combinatorial choice problem in a topology optimization algorithm is illustrated. At block 303, a topology optimization algorithm (e.g., a gradient based optimization solver) is executed using current values of the design variables. As an example, the design variables may be x1, x2 and x3 as described above. The topology optimization algorithm updates the values of the design values as its output. These current values are then transformed into a transformed coordinate system using a shape function as described above at block 304. The transformed coordinate system may form a tetrahedron as described above.

The projected values of the design variables are provided as input to an objective function operable to minimize some variable at block 305. As an example and not a limitation, the variable may be compliance in a design problem to minimize compliance in a resulting structure. At block 306, the objective function is run using the projected values of the design variables. The output of the objective function is a value of the variable (e.g., compliance).

At block 307, it is determined whether or not the objective function is minimized by comparing the current value of the variable to the previous value of the variable. If the present value is lower, then the objective function is not yet minimized. If the present value is the same (or substantially the same) as the previous value, then the objective function is minimized. It should be understood that embodiments of the present disclosure are not limited to any objective function, or any criteria as to when the objective function is minimized.

If the objective function is not minimized, the process moves to block 309 where the current values are transformed back into the normal coordinate system and into the unit cube. At block 310, the values of the design variables (e.g., x1, x2, and x3) are modified in some way to attempt to achieve convergence in the objective function. These modified values become the current values that are then input into the topology optimization algorithm at block 303. It should be understood that the projected values may modified first at block 309, and then the modified projected values may be transformed back into the normal coordinate system at block 310. The order of these steps at block 309 and 310 does not matter.

If the objective function is minimized at block 307, the process moves to block 308 where the projected values are transformed into the normal coordinate system and the process ends. The resulting structure may then be fabricated. Because the projected shape eliminates undesirable vertices and therefore combinations, the resulting design satisfies the constraint, such as the sum of the set of design variables must be 0 or 1.

Because of the flexibility of the methods of the present disclosure, these methods can be expanded to other combination problems by given an appropriate vertex set to the shape function. The vertex set shown in FIG. 1B is for a combination problem wherein one or none of three design variables may be equal to 1.

Figure 5A:
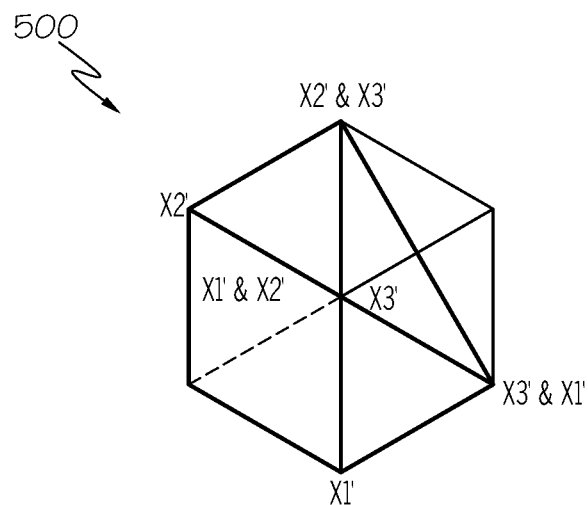
FIG. 5A schematically depicts an example transformed shape in a transformed coordinate system for the constraint of selection of one or two of three options according to one or more embodiments described and illustrated herein.
Figure 5B:
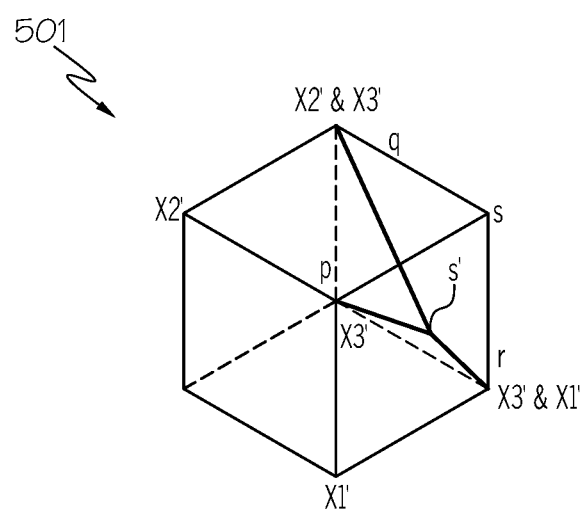
FIG. 5B schematically depicts the transformation from unit cube to the transformed shape depicted in FIG. 5A according to one or more embodiments described and illustrated herein.

FIG. 5A shows a transformed shape 500 in a transformed coordinate system for a problem of picking one or two of three options. In the example, K=3, and the values of the set of variables is equal to 0, 1 or 2. Thus, the variables that are equal to 1 may be x1', x2', x3', x1' & x2', x2' & x3', or x1' & x3'. FIG. 5B shows the actual transformation where vertices s is pulled inward as s'. The vertices s represents (1,1,1), which is not allowed under the constraint.

Figure 6:
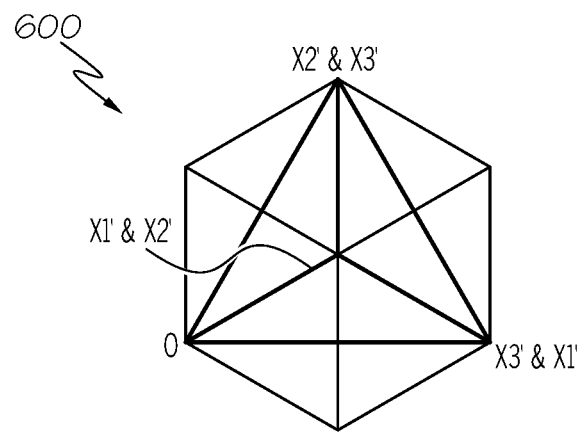
FIG. 6 schematically depicts an example transformation from unit cube to a transformed shape for the constraint of selection of exactly two of three options according to one or more embodiments described and illustrated herein.

Other configurations are also possible. FIG. 6 illustrates an actual transformation and resulting shape 600 for a constraint of picking none or exactly two of three options to be equal to 1. In this example, it is not possible to select x1', x2', x3' alone. Rather, the only possible combinations are x1' & x2', x2' & x3', or x1' & x3'.

Figure 7:
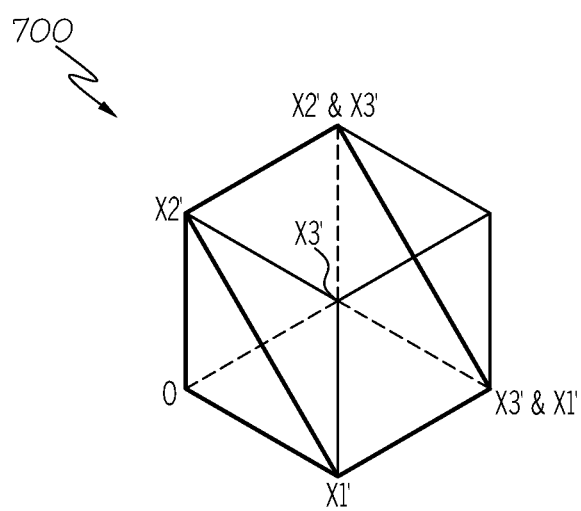
FIG. 7 schematically depicts an example transformation from unit cube to a transformed shape for the constraint of selection of one or two of three options except for (1,1,0) according to one or more embodiments described and illustrated herein.

FIG. 7 illustrates an actual transformation and resulting shape 700 for a constraint of picking none, one or two of three options except for (1,1,0) (i.e., except for x1' & x2').

Figure 8:
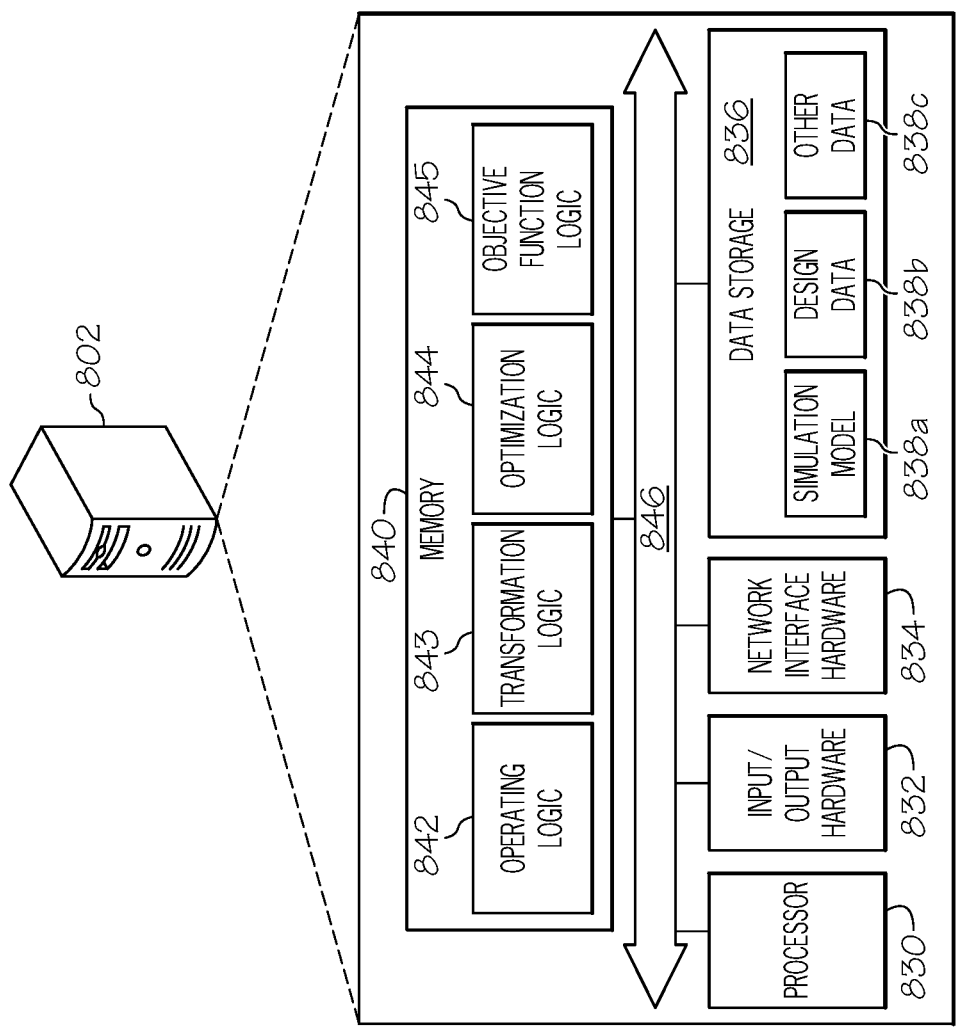
FIG. 8 schematically depicts an example computer system for performing the computer-implemented combinatorial choice and topology optimization methods described herein according to one or more embodiments described and illustrated herein.

FIG. 8 depicts an example computing device 802, further illustrating a system for multi-component topology optimization, and/or a non-transitory computer usable medium having computer readable program code for topology optimization embodied as hardware, software, and/or firmware, according to embodiments shown and described herein. While in some embodiments, the computing device 802 may be configured as a general purpose computer with the requisite hardware, software, and/or firmware, in some embodiments, the computing device 802 may be configured as a special purpose computer designed specifically for performing the functionality described herein. It should be understood that the software, hardware, and/or firmware components depicted in FIG. 8 may also be provided in multiple computing devices rather than one as shown in FIG. 8.

As also illustrated in FIG. 8, the computing device 802 may include a processor 830, input/output hardware 832, network interface hardware 834, a data storage component 836 (which may store simulation model data 838a, design data 838b, and other data 838c), and a non-transitory memory component 840. The memory component 840 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 840 may be configured to store operating logic 842, transformation and projection logic 843, optimization logic 844, and objective function logic 845 (each of which may be embodied as computer readable program code, firmware, or hardware, as an example). A local interface 846 is also included in FIG. 8 and may be implemented as a bus or other interface to facilitate communication among the components of the computing device 802.

The processor 830 may include any processing component configured to receive and execute computer readable code instructions (such as from the data storage component 836 and/or memory component 840). The input/output hardware 832 may include a graphics display device, keyboard, mouse, printer, camera, microphone, speaker, touch-screen, and/or other device for receiving, sending, and/or presenting data The network interface hardware 834 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 836 may reside local to and/or remote from the computing device 802, and may be configured to store one or more pieces of data for access by the computing device 802 and/or other components. As illustrated in FIG. 8, the data storage component 836 may store simulation model data 838a, which in at least one embodiment includes information relating to a simulation model resulting from the topology optimization. Similarly, design data 838b may be stored by the data storage component 836 and may include information relating to the topology optimization. Other data 838c may be stored in the data storage component 836 to provide support for functionalities described herein as needed.

Included in the memory component 840 may be the operating logic 842, the transformation and projection logic 843, optimization logic 844, and the objective function logic 845. It should be understood that the memory component 840 and/or the data storage component 836 may store any logic capable of performing the functionalities described herein. The operating logic 842 may include an operating system and/or other software for managing components of the computing device 802. The operating logic may also include computer readable program code for displaying the graphical user interface. Similarly, the transformation and projection logic 843 may reside in the memory component 840 and may be configured to perform the transformation and projection techniques described herein. The optimization logic 844 may perform the topographic optimization described herein, such as by a (mite element program. The objective function logic 845 may be configured to calculate a design variable resulting from the simulation model of the topology optimization, such as compliance, as described herein.

It should be understood that the components illustrated in FIG. 8 are merely exemplary and are not intended to limit the scope of this disclosure. More specifically, while the components in FIG. 8 are illustrated as residing within the computing device 802, this is a non-limiting example. In some embodiments, one or more of the components may reside external to the computing device 802.

It should now be understood that embodiments of the present disclosure are directed to computer-implemented methods of performing combinatorial choice in a non-linear programming problem. Embodiments may include topology optimization methods for designing structures made of multiple composite components (i.e., substructures). Combinatorial choice is handled by transformation of an original search space by using a shape function, $x'=N(x)_m$. A topology optimization algorithm is iteratively executed using current values of a set of variables until an objective function is minimized (e.g., minimized for compliance) After each iteration, values of the set of variables are provided from a unit cube in a normal coordinate system into a transformed shape in a transformed coordinate system by the shape function. Undesirable vertices of the unit cube are shifted to encourage convergence of the set of variables to a desirable outcome based on the constraint. The objective function is evaluated using the transformed values. If the objective function is not minimized, the transformed values are projected back into the unit cube of the normal coordinate system and the topology optimization algorithm is again executed using modified values. The process is iteratively executed until the objective function is minimized. The transformation may be configured to accommodate different types of constraints, such as picking only one option among a plurality of options, picking one or two of three options, and the like.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of performing combinatorial choice in a non-linear programming problem for designing a physical structure, comprising:
    establishing, by one or more processors, a set of K binary variables, wherein the set of K binary variables defines an original design search space of the physical structure comprising a K-dimensional unit cube in a normal coordinate system, and the K-dimensional unit cube comprises a plurality of desired vertices representing a plurality of desired combinations that satisfy a constraint and a plurality of undesired vertices representing a plurality of undesired combinations that do not satisfy the constraint; and
    transforming the K-dimensional unit cube from the normal coordinate system into a transformed shape in a transformed coordinate system using a shape function, wherein the shape function shifts the plurality of undesired vertices such that a design search space of the transformed shape is smaller than a design search space of the K-dimensional unit cube, wherein values of the set of K binary variables cannot have a combination represented by the plurality of undesired combinations, and wherein each variable of the set of K binary variables identifies a presence of at least one of no material or a material selected from a plurality of materials for at least one desired vertices of the plurality of desired vertices.

2. The method of claim 1, wherein the plurality of desired combinations is such that a summation of the values of the set of K binary variables is equal to 0 or 1.

3. The method of claim 1, wherein the plurality of desired combinations is such that a summation of the values of the set of K binary variables is equal to 0, 1 or 2, and K≥3.

4. The method of claim 1, wherein the plurality of desired combinations is such that a summation of the values of the set of K binary variables is equal to 0 or 2, and K≥3.

5. The method of claim 1, wherein the plurality of desired combinations is such that a summation of the values of the set of K binary variables is equal to 0, 1 or 2 except for at least one undesired combination, and K≥3.

6. The method of claim 1, wherein the transformed shape is tetrahedral.

7. The method of claim 1, wherein the set of K binary variables represents a set of possible materials present at least one design point within a design domain.

8. A method of designing a physical structure by computer-implemented topology optimization, the method comprising:
    establishing, by one or more processors, a plurality of design points for the physical structure;
    establishing a set of K variables for at least one design point of the plurality of design points, wherein the set of K variables defines a K-dimensional unit cube in a normal coordinate system and each variable of the set of K variables identifies a presence of at least one of no material or a material selected from a plurality of materials for the at least one design point of the plurality of design points;
    transforming the K-dimensional unit cube into a transformed shape in a transformed coordinate system using a shape function;
    iteratively executing a topology optimization algorithm until an objective function is minimized using current values of the set of K variables in the normal coordinate system, wherein each execution of the topology optimization algorithm updates values of the set of K variables;
    after each iteration of the execution of the topology optimization algorithm:
        projecting the current values of the set of K variables onto the transformed shape in the transformed coordinate system, thereby establishing projected current values of the set of K variables;
        executing the objective function using the projected current values of the set of K variables;
        determining if the objective function is minimized;
        when the objective function is not minimized, updating the projected current values and projecting the updated projected current values into the K-dimensional unit cube in the normal coordinate system; and
        when the objective function is minimized, projecting the projected current values into the K-dimensional unit cube and terminating the topology optimization algorithm, wherein termination of the topology optimization algorithm results in the set of K variables being defined by binary variables in a desired combination, the binary variables in the desired combination defining a plurality of composite components for the physical structure.

9. The method of claim 8, wherein the desired combination is such that a summation of the current values of the set of K variables is equal to 0 or 1.

10. The method of claim 8, wherein the desired combination is such that a summation of the current values of the set of K variables is equal to 0, 1 or 2, and K≥3.

11. The method of claim 8, wherein the desired combination is such that a summation of the current values of the set of K variables is equal to 0 or 2, and K≥3.

12. The method of claim 8, wherein the desired combination is such that a summation of the current values of the set of K variables is equal to 0, 1 or 2 except for at least one undesired combination, and K≥3.

13. The method of claim 8, wherein the K-dimensional unit cube comprises a plurality of desired vertices representing a plurality of desired combinations and a plurality of undesired vertices representing a plurality of undesired combinations.

14. The method of claim 13, wherein the plurality of undesired vertices are shifted into the transformed shape by the shape function such that values for the set of K variables cannot be equal to the plurality of undesired combinations represented by the plurality of undesired vertices.

15. The method of claim 13, wherein:
    K=3 and the set of K variables comprises x1, x2, and x3; and
    x1=1 indicates presence of a first material at the at least one design point, x2=1 indicates presence of a second material at the at least one design point, and x3=1 indicates presence of a third material at the at least one design point.

16. The method of claim 15, wherein the transformed shape is tetrahedral.

17. The method of claim 8, wherein the set of K variables represents a set of possible materials present at the at least one design point within the design domain.

18. The method of claim 8, wherein the termination of the topology optimization algorithm results in the physical structure comprising two or more materials.

19. The method of claim 8, wherein a design variable of the objective function is compliance.

20. The method of claim 8, further comprising fabricating the physical structure.

* * * * *

UNITED STATES PATENT AND TRADEMARK OFFICE
CERTIFICATE OF CORRECTION

Page 1 of 1

PATENT NO. : 11,132,478 B2
APPLICATION NO. : 16/164021
DATED : September 28, 2021
INVENTOR(S) : Tsuyoshi Nomura, Kazuhiro Saitou and Yuqing Zhou It is certified that error appears in the above-identified patent and that said Letters Patent is hereby corrected as shown below:

In the Specification

In Column 8, Line(s) 33, delete "(mite" and insert --finite--, therefor.

In the Claims

In Column 9, Line(s) 59, before "least", insert --at--.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*